Patented July 14, 1931

1,814,146

UNITED STATES PATENT OFFICE

PHILIP H. GROGGINS, OF WASHINGTON, DISTRICT OF COLUMBIA; DEDICATED, BY ASSIGNMENT, TO THE GOVERNMENT AND THE PEOPLE OF THE UNITED STATES OF AMERICA

PROCESS FOR THE PREPARATION OF 4-HALOGEN-BETA-PHENYL-ANTHRAQUINONE

No Drawing.   Application filed August 8, 1929.  Serial No. 384,513.

(GRANTED UNDER THE ACT OF MARCH 3, 1883, AS AMENDED APRIL 30, 1928; 370 O. G. 757)

This application is made under the act approved April 30, 1928, and the invention herein described may be manufactured and used by and for the Government for governmental purposes without payment to me of any royalty thereon.

My invention relates to 4-halogen-beta-phenyl-anthraquinone and a process for making the same.

It is the object of my invention to provide a simple and economically practicable method for making 4-halogen-beta-phenyl-anthraquinones which are new and valuable intermediates for the preparation of dyestuffs. Other and further aspects of this invention will be apparent from the disclosures in the specification and appended claims.

I have discovered that 4-halogen-para-phenyl-ortho-benzoyl-benzoic acid which has been described in my copending application Serial No. 384,506, filed August 8, 1929, under certain conditions loses one molecule of water and closes the ring to form 4-halogen-beta-phenyl-anthraquinones. This reaction is probably best expressed by the following equation in which hlg represents a halogen atom, such as chlorine or bromine:

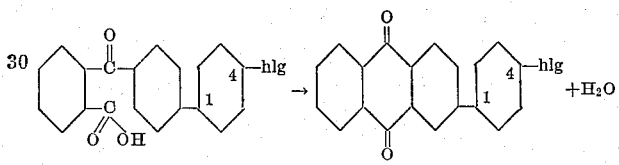

The elimination of water from 4-halogen-para-phenyl-ortho-benzoyl-benzoic acid may be brought about by suitable dehydrating agents such as fuming or hydrated sulfuric acid or a mixture of sulfuric acid and boric acid. The fact that this reaction proceeds at all without sulfonation is quite unexpected, since phenyl anthraquinone can not be made with sulfuric acid as a dehydrating agent, as sulfonation simultaneously occurs and a water soluble product is obtained. Other dehydrating agents such as sulfuryl chloride, thionyl chloride, or phosphorous pentachloride may be used also.

4-chloro-beta-phenyl-anthraquinone is a lustrous yellow product which crystallizes in long fine needles. It gives all the typical reactions of anthraquinone derivatives of this types. The pure product gives a constant melting point of 210° C.

Without limiting my invention to any particular procedure the following examples will serve to illustrate my invention in the preferred form:

*Example I.*—Twenty parts of 4-chloro-para-phenyl-ortho-benzoyl-benzoic acid are dissolved in 100 parts of sulfuric acid (monohydate) and 10 parts of boric acid. The solution is heated to 125° C. and maintained at this temperature for three hours. The 4-halogen-beta-phenyl-anthraquinone may be separated by fractional crystallization by diluting with water to give a residual acidity of 80 per cent $H_2SO_4$ or the reaction product may be poured into 1000 parts of cold water. The precipitate is filtered and washed free of mineral acid with water. It is then dried at 110° C. The yield is substantially the theoretical. The melting point of the crude product is 208° C. When recrystallized from chlorobenzene it melts at 210° C.

*Example II.*—Twenty parts of 4-chloro-para-phenyl-ortho-benzoyl-benzoic acid are treated with 60 parts of 23 per cent fuming sulfuric acid at 100° C. for two hours. The reaction mass is poured slowly into one liter of iced water under constant agitation. The precipitated 4-chloro-beta-phenyl-anthraquinone is filtered and washed with hot water until free of mineral acid. It is then dried at 110° C.

*Example III.*—The preparation of 4-bromo-beta-phenyl-anthraquinone may be carried out following the procedure in Examples I and II except that molecular porportions of 4-bromo-para-phenyl-ortho-benzoyl-benzoic acid are used instead of the corresponding chloro compound.

I am aware that many changes may be made and numerous details of the process may be varied through a wide range without departing from the principles of this invention, and I therefore do not purpose limiting the patent granted hereon, otherwise than necessitated by the prior art.

I claim as my invention—

1. The process of preparing 4-halogen-beta-phenyl-anthraquinone which comprises heating 4-halogen-para-phenyl-ortho-benzoyl-benzoic acid at a temperature of about 125° C. with sulfuric acid monohydrate as a dehydrating agent.

2. The process of preparing 4-halogen-beta-phenyl-anthraquinone which comprises heating 4-halogen-para-phenyl-ortho-benzoyl-benzoic acid with a mixture of 95 per cent. sulfuric acid and boric acid as a dehydrating agent at a temperature of about 125° C.

3. The process of preparing 4-halogen-beta-phenyl-anthraquinone which comprises heating 4-halogen-para-phenyl-ortho-benzoyl-benzoic acid with fuming sulfuric acid as a dehydrating agent at a temperature of about 100° C. for a period of approximately two hours.

4. The process of preparing 4-cholo-beta-phenyl-anthraquinone which comprises heating 4-chloro-para-phenyl-ortho-benzoyl-benzoic acid with sulfuric acid monohydrate and boric acid at a temperature of about 125° C. for a period of approximately three hours and diluting the reaction mass with water to precipitate out the 4-chloro-beta-phenyl-anthraquinone.

5. As new articles of manufacture 4-halogen-beta-phenyl-anthraquinone having most probably the following chemical formula, in which hlg represents a halogen atom:

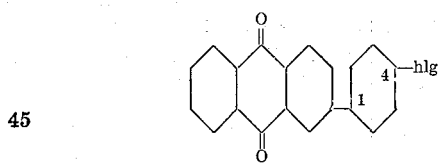

6. As a new article of manufacture 4-chloro-beta-phenyl-anthraquinone having most probably the following chemical formula:

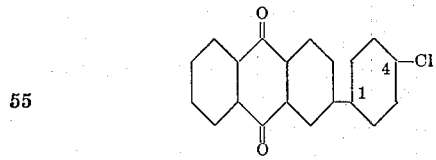

In testimony whereof, I have hereunto subscribed my name.

PHILIP H. GROGGINS.